United States Patent
Cooper et al.

(10) Patent No.: US 7,742,580 B2
(45) Date of Patent: *Jun. 22, 2010

(54) METHODS AND APPARATUS FOR CONTEXT AND EXPERIENCE SENSITIVE PROMPTING IN VOICE APPLICATIONS

(75) Inventors: Robert S. Cooper, Columbia, SC (US); Derek Sanders, Columbia, SC (US); Vladimir Sergeyevich Tokarev, Columbia, SC (US)

(73) Assignee: Avaya, Inc., Basking Ridge, NJ (US)

( * ) Notice: Subject to any disclaimer, the term of this patent is extended or adjusted under 35 U.S.C. 154(b) by 1044 days.

This patent is subject to a terminal disclaimer.

(21) Appl. No.: 10/772,829

(22) Filed: Feb. 5, 2004

(65) Prior Publication Data

US 2005/0177374 A1    Aug. 11, 2005

(51) Int. Cl.
G10L 15/28 (2006.01)
G10L 15/00 (2006.01)
H04M 1/64 (2006.01)
G10L 21/00 (2006.01)

(52) U.S. Cl. .............. 379/88.22; 704/231; 704/255; 704/257; 704/270.1; 704/275; 379/68; 379/88.04

(58) Field of Classification Search .......... 704/231, 704/236–240, 243–257; 379/67.1–69, 88.01–88.06, 379/88.11–88.28
See application file for complete search history.

(56) References Cited

U.S. PATENT DOCUMENTS

| | | | | |
|---|---|---|---|---|
| 5,428,679 A | * | 6/1995 | French .................. | 379/201.04 |
| 5,748,841 A | * | 5/1998 | Morin et al. ................ | 704/257 |
| 5,905,774 A | * | 5/1999 | Tatchell et al. ........... | 379/88.04 |
| 5,918,222 A | * | 6/1999 | Fukui et al. .................... | 707/1 |
| 5,956,024 A | * | 9/1999 | Strickland et al. ........... | 715/717 |
| 6,144,938 A | * | 11/2000 | Surace et al. ............... | 704/257 |
| 6,154,527 A | * | 11/2000 | Porter et al. ............. | 379/88.18 |
| 6,233,561 B1 | * | 5/2001 | Junqua et al. ............... | 704/277 |
| 6,334,103 B1 | | 12/2001 | Surace et al. | |
| 6,510,411 B1 | * | 1/2003 | Norton et al. ............... | 704/254 |

(Continued)

FOREIGN PATENT DOCUMENTS

DE    100 35 869 A1    1/2002

(Continued)

OTHER PUBLICATIONS

European Search Report for Application No. EP 05 25 0565, completed May 11, 2005.

*Primary Examiner*—David R Hudspeth
*Assistant Examiner*—David Kovacek

(57) ABSTRACT

Systems and techniques for improved user prompting. A system according to one aspect of the invention includes a central server hosting various modules providing services to users. The modules suitably employ voice recognition in order to interpret user inputs. Each module has access to user information that includes information indicating the user's experience with each function of each module. When a module needs to issue a prompt to the user, it retrieves and examines the user information to determine the user's experience with the module and function. Suitably, each module is operative to categorize a user as belonging to an experience category, such as novice, intermediate and expert based on the user's level of experience with the function. The module selects a prompt associated with the user's level of experience with the function and presents it to the user.

20 Claims, 2 Drawing Sheets

U.S. PATENT DOCUMENTS

| | | | |
|---|---|---|---|
| 6,560,576 B1 * | 5/2003 | Cohen et al. | 704/270 |
| 6,567,805 B1 * | 5/2003 | Johnson et al. | 707/5 |
| 6,587,547 B1 * | 7/2003 | Zirngibl et al. | 379/88.17 |
| 6,594,355 B1 * | 7/2003 | Deo et al. | 379/219 |
| 6,718,366 B2 * | 4/2004 | Beck et al. | 709/204 |
| 6,748,361 B1 * | 6/2004 | Comerford et al. | 704/275 |
| 6,859,529 B2 * | 2/2005 | Duncan et al. | 379/266.1 |
| 6,934,756 B2 * | 8/2005 | Maes | 709/227 |
| 6,944,592 B1 * | 9/2005 | Pickering | 704/251 |
| 6,944,594 B2 * | 9/2005 | Busayapongchai et al. | 704/275 |
| 6,970,474 B1 * | 11/2005 | Sinha | 370/401 |
| 7,050,976 B1 * | 5/2006 | Packingham | 704/270 |
| 7,158,935 B1 * | 1/2007 | Gorin et al. | 704/257 |
| 7,305,381 B1 * | 12/2007 | Poppink et al. | 707/3 |
| 7,324,942 B1 * | 1/2008 | Mahowald et al. | 704/270 |
| 7,415,406 B2 * | 8/2008 | Huang et al. | 704/9 |
| 7,460,652 B2 * | 12/2008 | Chang | 379/88.18 |
| 7,515,695 B1 * | 4/2009 | Chan et al. | 379/88.18 |
| 2002/0001302 A1 * | 1/2002 | Pickett | 370/352 |
| 2002/0105532 A1 * | 8/2002 | Oblinger | 345/701 |
| 2002/0107842 A1 * | 8/2002 | Biebesheimer et al. | 707/3 |
| 2002/0169618 A1 * | 11/2002 | Caspari | 704/275 |
| 2003/0123618 A1 * | 7/2003 | Bhargava et al. | 379/88.01 |
| 2004/0006480 A1 * | 1/2004 | Ehlen et al. | 704/276 |
| 2004/0028027 A1 * | 2/2004 | McClung et al. | 370/352 |
| 2004/0179659 A1 * | 9/2004 | Byrne et al. | 379/88.18 |
| 2004/0210923 A1 * | 10/2004 | Hudgeons et al. | 725/24 |
| 2005/0069095 A1 * | 3/2005 | Fellenstein et al. | 379/88.02 |
| 2006/0062381 A1 * | 3/2006 | Herron et al. | 379/433.04 |
| 2008/0086564 A1 * | 4/2008 | Putman et al. | 709/227 |

FOREIGN PATENT DOCUMENTS

| | | |
|---|---|---|
| WO | WO 01/7555 A2 | 10/2001 |
| WO | WO 2005/008627 A1 | 1/2005 |

* cited by examiner

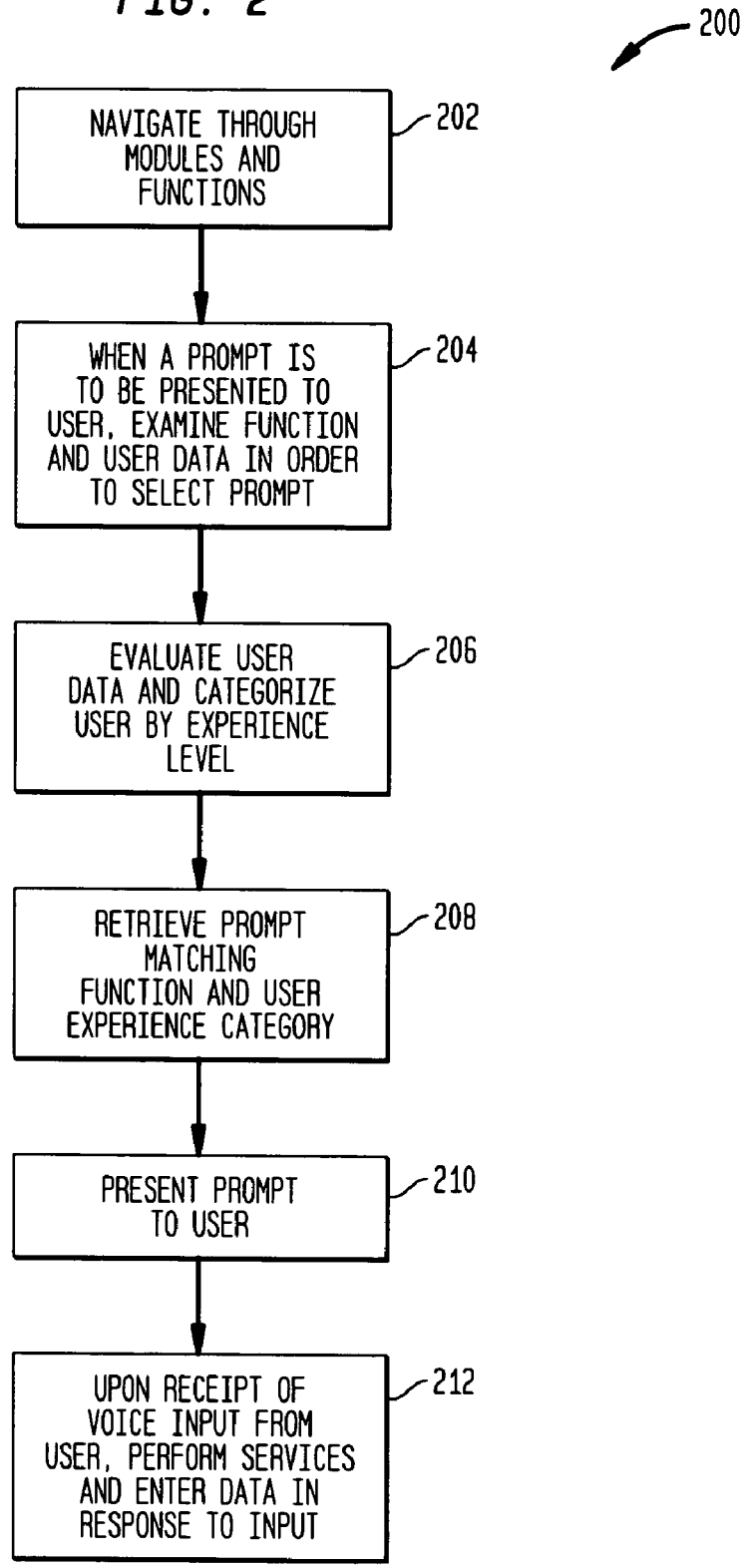

METHODS AND APPARATUS FOR CONTEXT AND EXPERIENCE SENSITIVE PROMPTING IN VOICE APPLICATIONS

FIELD OF THE INVENTION

The present invention relates generally to improvements in automated voice response systems. More particularly, the invention relates to advantageous systems and techniques for providing menus and other assistance to a user of a voice response system.

BACKGROUND OF THE INVENTION

Automated voice response systems, particularly systems employing speech recognition, must frequently provide guidance to a user so that the user may properly format his or her inputs and repeat inputs that were not properly recognized by the system. In order to achieve user satisfaction, voice response systems must provide prompts to users that indicate the format and content of the inputs needed from a user, so that the user's inputs can be interpreted accurately. In addition, presentation of prompts by the systems must not be too time consuming for a user. The nature of voice response systems makes them particularly prone to consume too much of a user's time because much of the information presented by a system, particularly menu information, is presented in sequence. The information a user needs to hear may be preceded by other information of no interest to the user.

One approach to providing user menus that are not excessively burdensome is the use of contextual menus. Contextual prompting provides prompts that are based on the user's position in the application. For example, if a user is listening to voicemail, one set of prompts is provided. If a user is searching a directory in order to place a call, another set of prompts is provided. Such directed selection of prompts helps reduce the number of choices presented to the user, but typical present day systems do not sufficiently advantageously distinguish between users. For example, expert users may know all the different inputs that are required for each stage of an application, other users may be very experienced with some portions of the application but not with other portions, and relatively inexperienced users are likely to be unfamiliar with the inputs required for a system and need fairly extensive information, such as a relatively complete list of available input choices.

In typical prior art systems, however, little or no distinction is made between such users. Instead, because of the necessity that all users be provided with enough information to enable them to provide a correctly formatted input that will achieve the result they desire, all users are typically treated in the same manner. More experienced users, therefore, are forced to listen to much more extensive prompts than they need. Systems that provide extensive prompts to all users waste time and cause significant dissatisfaction among users that do not require elaborate prompts. Conversely, if a system employs shorter prompts, it may run the risk that the prompts will be insufficiently detailed for less expert users.

There exists, therefore, a need for automated voice response systems that are capable of determining the experience level of a user for various stages of an application and for providing prompts that take into account the particular user's level of experience or ability to successfully work with the stage of the application being used.

SUMMARY OF THE INVENTION

A system according to one aspect of the invention includes a central server hosting various modules providing services to users. The modules may suitably employ voice recognition in order to interpret user inputs. When a module needs an input from a user, it selects an appropriate prompt for presentation to the user. The module has access to user information that includes information indicating the user's experience with each function of each module. The module examines the user information to determine the user's experience with the module and function. Suitably, the module categorizes a user as belonging to an experience category, such as novice, intermediate or expert based on the user's level of experience with the function. The module selects a prompt associated with the user's level of experience with the function and presents it to the user. The use of context and experience information in selection of prompts is also discussed in "Methods and Apparatus for Context and Experience Sensitive Help in Voice Applications," U.S. Pat. Ser. No. 10/772,483, assigned to a common assignee with the present invention and filed on even date herewith, and incorporated herein by reference in its entirety.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates a process of voice response employing user and context sensitive prompting according to an aspect of the present invention.

DETAILED DESCRIPTION

Figure 1:
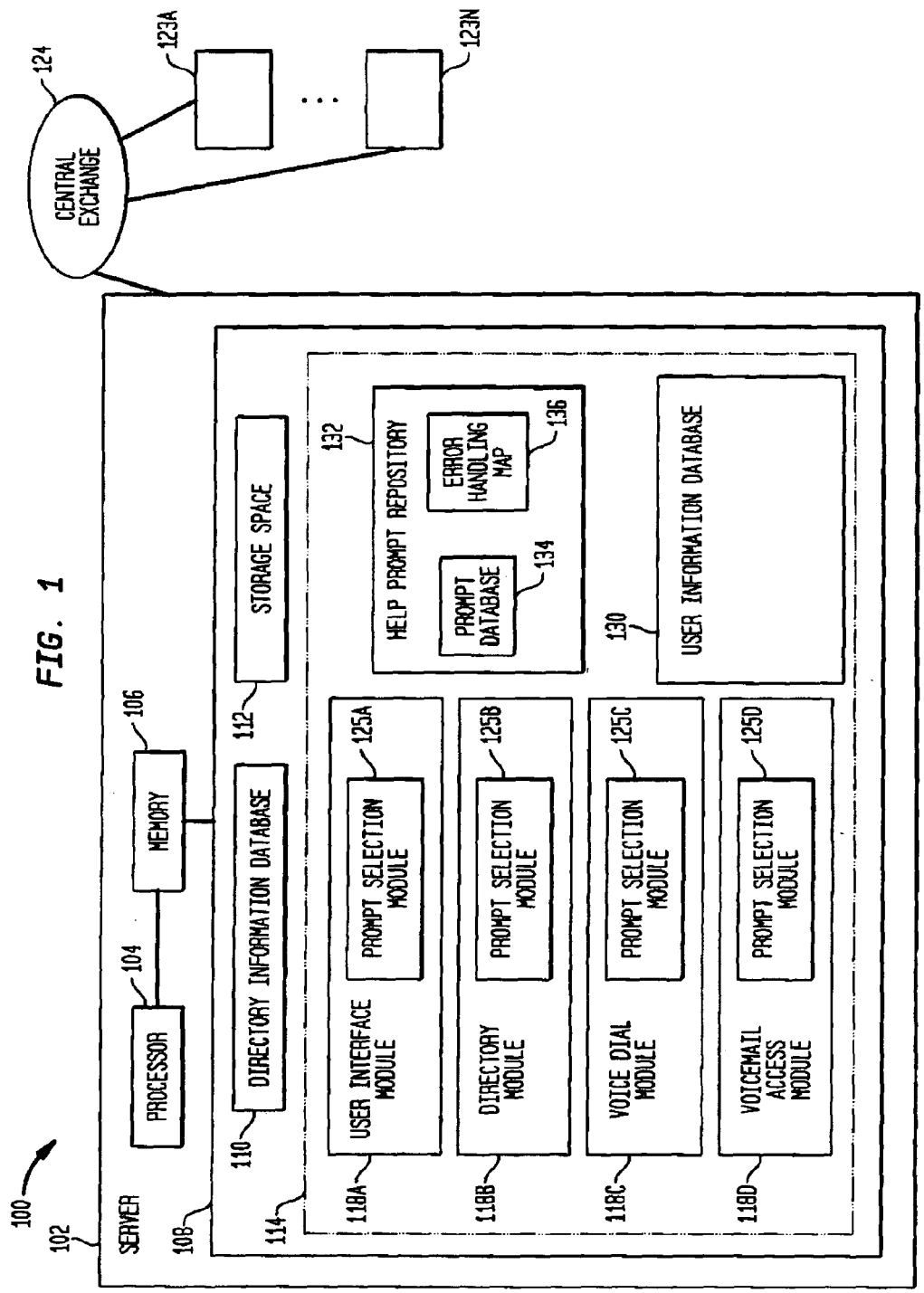
FIG. 1 illustrates a system employing user and context sensitive prompting according to an aspect of the present invention.

FIG. 1 illustrates a system 100 employing user and context sensitive prompting according to an aspect of the present invention. For purposes of illustration, the system 100 is a central telephone system providing telephone services and related services, such as directory lookup, voice dialing and voice mail to users. It will be recognized, however, that a system such as the system 100 may suitably be implemented so as to provide any of a number of services. For example, a system may provide bank account information to customers or potential customers or may be used in a customer service center, allowing selection of prerecorded information for some problems and referring a customer to an appropriate agent for other problems.

The system 100 may suitably comprise a central server 102, including a processor 104, memory 106 and long term storage 108. The server 102 hosts or has access to information and data storage facilities of interest to users, for example, directory information and voice mail storage. The directory information may suitably be stored in a directory information database 110, hosted as a file on the long term storage 108, and the voice mail storage may be allocated to storage space 112 on the long term storage 108. It will be recognized that storage facilities such as the directory 110 and the storage space 112, and data such as the data stored therein, need not be hosted on the server 102, but may be hosted in any desired location or component.

The system 100 may suitably host a voice response application 114, suitably implemented as software residing on the long term storage 108 and executed under the control of the processor 104. The voice response application 114 includes a user interface module 118A and a plurality of additional modules. As illustrated here, the additional modules are a directory module 118B, a voice dial module 118C and a voicemail access module 118D. The modules 118B, 118C and 118D are invoked by the user interface module 118A as required, in response to a user's inputs.

Each user communicates with the server 102 by means of a telephone set such as the internal telephone sets 123A . . . 123N. Such telephone sets may be part of an internal office phone system or may be external sets that connect to the server 102 by dialing a central exchange 124 communicating with the server 102. When a user makes an initial contact with the server 102, for example, by placing a call to the central exchange 124 or by picking up a handset of an internal telephone, the user interface module 118A provides an initial prompt to the user and receives user inputs. Depending on the user's response, the user interface module 118A invokes the module 118B, 118C or 118D, as appropriate. The module that has been invoked then issues prompts, receives user inputs and takes actions, such as placing a call or retrieving voice mail, in order to perform the service desired by the user.

The modules 118A, 118B, 118C and 118D include prompt selection modules 125A, 125B, 125C and 125D, in order to provide for selection of prompts appropriate for the operation being performed and for the experience level of the user.

The prompt selection modules 124A, 124B, 124C and 124D maintain awareness of the particular function for which prompting is required. During operation of each of the modules 118A, 118B, 118C and 118D, each module passes information to its prompt selection module indicating the active function. Each of the prompt selection modules 124A, 124B, 124C and 124D receives information indicating the active function, that is, the function with which the user is currently engaged. In addition, each of the prompt selection modules 124A, 124B, 124C and 124D is operative to receive proficiency information for the user, indicating the user's facility with the function being executed and with the use of the system 100 as a whole. The proficiency information may suitably be taken from a user information database 130. Each of the prompt selection modules 124A, 124B, 124C and 124D uses the proficiency information to select or create an appropriate prompt to be provided to the user. Prompts may suitably be selected from a prompt repository 132, according to a set of rules implemented by the currently operating one of the modules 124A, 124B, 124C and 124D. The prompts may suitably be stored in a prompt database 134 stored in the repository 132.

Alternatively, the currently operating prompt selection module may create a prompt based on information stored in the database 134, taking into consideration the module and function being employed, as well as proficiency information taken from the database 130.

Suitably, the prompt delivered to the user is based on the user's proficiency, as indicated in a user record stored in the database 130. Each user record may suitably include a function usage tally for each function, indicating the number of times the user has successfully performed the function. Prompts are suitably oriented toward novice, intermediate or expert users. Parameters or settings of the prompt selection modules 125A, 125B, 125C and 125D may suitably include criteria for distinguishing between novice, intermediate and expert users and may adapt prompts to the appropriate level of user based on the user's proficiency information. Alternatively, the prompts stored in the prompt repository 132 may suitably be organized according to module, function and function usage tally. When a prompt is to be selected, the currently operating prompt selection module receives or looks up module, function and function usage tally information, and the currently operating prompt selection module may use this information as an index for searching the database 134.

For example, the database 134 may include a comprehensive explanatory prompt to be presented by the user interface module 118A to a user with no experience using the system 100. The prompt might be a comprehensive recitation of all the functions that were available, and might be associated with a function usage tally of 0 for all functions. The prompt selection module 125A would simply search the database 134 for the prompt associated with the user interface module 118A and also associated with a function usage tally of 0.

Each of the modules 118A, 118B, 118C and 118D has access to the user information database 130. The user information database 130 includes a usage history for each user. In the embodiment discussed here, the usage history for a user includes a tally for each function, indicating the number of times the user has successfully employed the function. It will be recognized, however, that alternative techniques for describing a user's usage history are possible. For example, a proficiency score may be maintained, with the score taking into account information including the number of times the user has successfully employed the function as well as the number of errors made when using the function and the number of repetitions and prompts that have been required.

The usage history for a user is suitably organized by module. That is, the user's usage history for the functions carried out by the module 118A are grouped together, the user's usage history for the functions carried out by the module 118B are grouped together, and so on. This organization provides a simple and convenient way for a module to retrieve information relating to a user's likely needs for prompting for a particular function. For example, when the voicemail module 118D is to issue a prompt relating to a function, the prompt selection module 125D searches the user information database 130 to find a user entry for the user. The voicemail module 118D searches the user entry for the function for which the prompt is to be issued. The prompt selection module 125D obtains the user's usage tally for the function. The prompt selection module 125D uses the usage tally as an index to search the prompts related to the function for which the prompt is to be issued, and to select the prompt associated with the user's usage tally value for the function. The prompt is then passed to the user interface module 118A, which presents the prompt for the user, suitably by playing the prompt using a sound recorder or a voice synthesizer.

The prompts stored in the database 134 may suitably be organized by module, by functional area and by experience category. The database 134 includes a collection of prompts for each of the modules 118A-118D. For example, the voice mail access module 118D may include the functions "play messages," "next message," "delete message," "repeat message" and "save message." Depending on a user's facility with each function, different messages may be needed to assist the user in providing a correct voice input for a particular function. Thus, for example, the database 134 may include three prompts for each of the functions performed by the module 118D. The prompts for each function may include a prompt directed to novice users, a prompt directed to intermediate users and a prompt directed to expert users. It will be recognized that while three experience categories are described, additional experience categories may be employed as desired.

One example of a prompt might be one directed toward an expert user of the "play messages" function of the "voicemail access" module. An expert user might need only a simple and short prompt, such as an indication of the function being employed. A suitable prompt for such circumstances might be "messages" and might be characterized and indexed as "voicemail access, play messages, expert user," or by a suitable symbolic or numerical representation of such indexing.

An exemplary technique of organizing and indexing prompts, that may suitably be employed in constructing and searching the database 134, is as follows. The prompts are grouped in the database 134 according to the module with which they are associated, and the search for a particular prompt is performed in the prompts associated with the module being used. Each module performs a number of different functions, and a number of experience levels may be associated with each function. For one embodiment, the prompts for each module are organized in the form of an array $P(X, g(F_x))$, where P is the prompt to be played, X indicates the function being performed, and $g(F_x)$ indicates the experience category associated with the prompt P, where $F_x$ is the user's usage tally for the function X. The value of $F_x$ is the number of times a user has successfully used the function X. For example, if the function under consideration is the function "repeat messages," the value of $F_x$ would be the number of times a user had successfully used that function.

The value of $g(F_x)$ may suitably be an integer and may be assigned a value depending on the value of $F_x$. If a user may have one of m different experience levels for the function X, the value of $g(F_x)$ may suitably be defined as follows:

$g(F_x)=1$ if $0 \leq F_x < C_1$ $g(F_x)=2$ if $C_1 \leq F_x < C_2$ $g(F_x)=3$ if $C_2 \leq F_x < C_3$ $g(F_x)=m$ if $F_x > C_{m-1}$.

The values of $C_1$, $C_2$, $C_3$, and so on, are chosen based on an estimate of how many successful uses of a function puts a user into a particular experience category. For example, if a novice user is considered to be a user who has successfully used a function four times or less, the value of $C_1$ for that function may be set to 5. An intermediate user may be one who has used the function 5 to 24 times, in which case the value of $C_2$ is set to 25, and an advanced user may be one who has used the function 25 times or more. In this example, there would be only three categories, that is, novice, intermediate and expert, and values would be assigned only to $C_1$ and $C_2$.

To take an example, suppose that a user, Mary, is using the system 100. The user information database 130 includes a user entry for Mary. The entry includes function tallies for each function, with the function usage tally indicating the number of times the user has successfully used the function. The function tallies provide evidence that can be interpreted to indicate the user's proficiency for each of the functions performed by the voice dial module 118C and the voicemail module 118D, as well as with the overall system 100, and is organized as follows:

| Module | Function | Function usage tally |
|---|---|---|
| Overall system | Main menu accesses | 188 |
| Overall system | Main menu commands | 202 |
| Voice dialing module | Call menu accesses | 197 |
| Voice dialing module | Call by contact | 98 |
| Voice dialing module | Call by directory | 52 |
| Voice dialing module | Call by number | 47 |
| Voicemail module | Message menu accesses | 5 |
| Voicemail module | Play message | 0 |
| Voicemail module | Delete message | 0 |

The tally for main menu accesses indicates the number of times Mary has employed the system 100. Mary's user entry indicates a large number of successful uses of each function of the voice dial module 118C, suggesting that she is an expert user of the voice dial module 118C. Mary's user entry indicates only a few menu accesses of the voicemail module 118D and no successful uses of the other functions of that module, suggesting that Mary is a novice user of the voicemail module 118D. Therefore, the voice dial module 118C will provide relatively brief prompts, and the voicemail module 118D will provide more detailed prompts.

Suppose that Mary accesses the system 100 in order to place a call. Based on her expertise with the voice dialing module 118C, the dialog between Mary and the system might proceed as follows:

System—"Call control menu."
Mary—"Dial by directory."
System—"Directory."
Mary—"Derek Sanders."

The prompts are relatively short, and have the advantage of consuming little time. Because Mary is an expert user, the prompts are sufficient to allow her the guidance she needs. If Mary were a less expert user, the following interaction might take place:

System—"Call control menu. What would you like to do?"
Mary—"Dial by directory."
System—"Directory. Whom would you like to call?"
Mary—"Derek Sanders."

Once Mary has finished the interaction, her user tallies for Main menu accesses, main menu commands and dial by directory are incremented in order to reflect her additional experience.

As noted above, Mary's function usage tally suggests that she is less expert with the voice mail module 118D than with the voice dial module 118C. Thus, a dialog with the voice dial module 118D might proceed as follows:

System—"Main menu."
Mary—"Go to messages."
System—"Message menu. Here you can say "read my messages" or "help" for more options."
Mary—"Read my messages."
System—"<Plays first message>. Now you can say, "save message," "delete message," or "play next message." At any time during a message, you can say "skip message" in order to go to the next message."

In this case, the initial prompt is brief because Mary is an expert user with respect to the initial interaction, that is, with the user interface module 118A. The prompts relating to the voicemail module 118D are more detailed, because Mary is a novice user with respect to the voicemail module 118D.

FIG. 2 illustrates the steps of a process 200 for voice response including user and context sensitive prompting according to an aspect of the present invention. At step 202, in response to user commands and data inputs, navigation through various modules and functions is performed. At step 204, when a prompt is to be presented to a user, function and user data is examined in order to provide information required to select an appropriate prompt for the user. The function and user data indicates the function for which prompting is required, and the user data indicates the user's level of experience with the function and with the voice response system as a whole. At step 206, the user data is evaluated and the user is categorized by experience level, for example, novice, intermediate, or expert. At step 208, a prompt matching the function and the user's experience category is retrieved from a previously assembled collection of prompts indexed by module, function and experience category. At step 210, the prompt is presented to the user. At step 212, upon receiving a user input, services are performed and data is entered in response to the input. The process then returns to step 202.

While the present invention is disclosed in the context of a presently preferred embodiment, it will be recognized that a wide variety of implementations may be employed by persons of ordinary skill in the art consistent with the above discussion and the claims which follow below.

We claim:

1. A voice recognition system comprising:
   a plurality of modules comprising at least a voice dialing module and a voicemail module for receiving voice inputs from a user and performing services for the user in response to the voice inputs, each of the plurality of modules including multiple functions;
   a user information database storing user records including a function usage tally indicating the number of times the user has successfully performed each function; and
   a prompt selection module for obtaining module, function and function usage tally information for an active function currently being used by a user, selecting a prompt for presentation to the user, a prompt being a message from the system to the user calling for a user input appropriate to the function being performed, the prompt selection module identifying both an overall experience level of the user with the system and an experience level with the active function, and selecting a prompt appropriate to the user's experience level with the active function, selection of prompts tending to favor the presentation of more abbreviated prompts to users with greater experience levels with the active function;
   wherein a usage history for the user is organized on a module by module basis and the function usage tally is used as an index for the prompt selection module.

2. The system of claim 1, wherein each module incorporates a prompt selection module to select prompts for that module.

3. The system of claim 2, wherein the prompt selection for each module identifies the function for which prompting is needed and selects from among prompts associated with that function.

4. The system of claim 3, wherein the user information database includes information indicating the user's proficiency in using the overall system.

5. The system of claim 1, wherein a user proficiency score is determined for the current function that takes into account the number of times the user has successfully performed the active function as well as the number of errors and the number of repetitions and prompts.

6. The system of claim 1, wherein the user information database also stores the number of errors for each function.

7. The system of claim 6, wherein the prompt selection being used employs the function usage tally for a function to determine a user experience category for the user with respect to the function.

8. The system of claim 7, wherein the prompt selection being used determines the user experience category by selecting an experience category associated with a range of function usage tally values within which the user's function usage tally for the function falls.

9. The system of claim 8, wherein the prompt selection selects a prompt associated with the user experience category.

10. A method of prompt selection in a voice recognition system employing a plurality of modules including at least a voice dialing module and a voice mail module, each of the plurality of modules including multiple functions, comprising the steps of:
    passing information indicating an active function currently being used by a user from a module to a prompt module;
    storing user records including a function usage tally indicating the number of times a user has successfully performed each of the multiple functions on a function by function basis;
    utilizing the active function information by the prompt module to retrieve both a user experience level for the system and for the function, said identifying including obtaining function usage tally information for the active function; and
    selecting a prompt appropriate for the user experience level for the active function, the prompt being a message from the system to the user calling for a user input appropriate to the active function, selecting of a prompt tending to favor the presentation of more abbreviated prompts to users with higher experience levels while favoring the presentation of more elaborate prompts providing greater detail about the nature of input needed for users with lower experience levels with the active function;
    wherein a usage history for the user is organized on a module by module basis and the function usage tally is used as an index for the prompt selection prompt.

11. The method of claim 10, wherein the step of identifying the user experience level is followed by a step of identifying the user as belonging to a particular experience category and wherein the step of selecting a prompt includes selecting a prompt associated with the experience category to which the user belongs.

12. The method of claim 11, wherein identifying the user experience category for the active function includes examining user information for the active function retrieved from a voice information database storing user records including a function usage tally indicating a number of errors in attempting to use the active function by the user.

13. The method of claim 12, wherein identifying the user experience category for the active function includes assigning the user to an experience category associated with a range of function usage tally values within which the user's function usage tally for the active function falls.

14. The method of claim 13, further including a step of updating the user information for each function whenever the user successfully invokes the function.

15. The method of claim 14, wherein the step of updating the user information includes updating the user's function usage tally for a function upon each successful use of that function.

16. The system of claim 1 wherein the multiple functions for the voice dialing module include call menu accesses, call by contact, call by directory, and call by number; and the multiple functions for the voicemail module include message menu access, play message, and delete message.

17. The system of claim 1 wherein the plurality of modules further comprise a user interface module and a directory module.

18. The system of claim 1 wherein the plurality of modules are invoked by a user interface module as required in response to inputs by the user.

19. The system of claim 1 wherein each of the plurality of user modules has a corresponding prompt module which receives information indicating the active function and maintains awareness of the active function for which prompting is required.

20. The system of claim 1 wherein the function usage tally is used as index by the prompt selection module for searching for a prompt in a prompt database organized on a module by module basis.

* * * * *